United States Patent Office  3,285,193
Patented Nov. 15, 1966

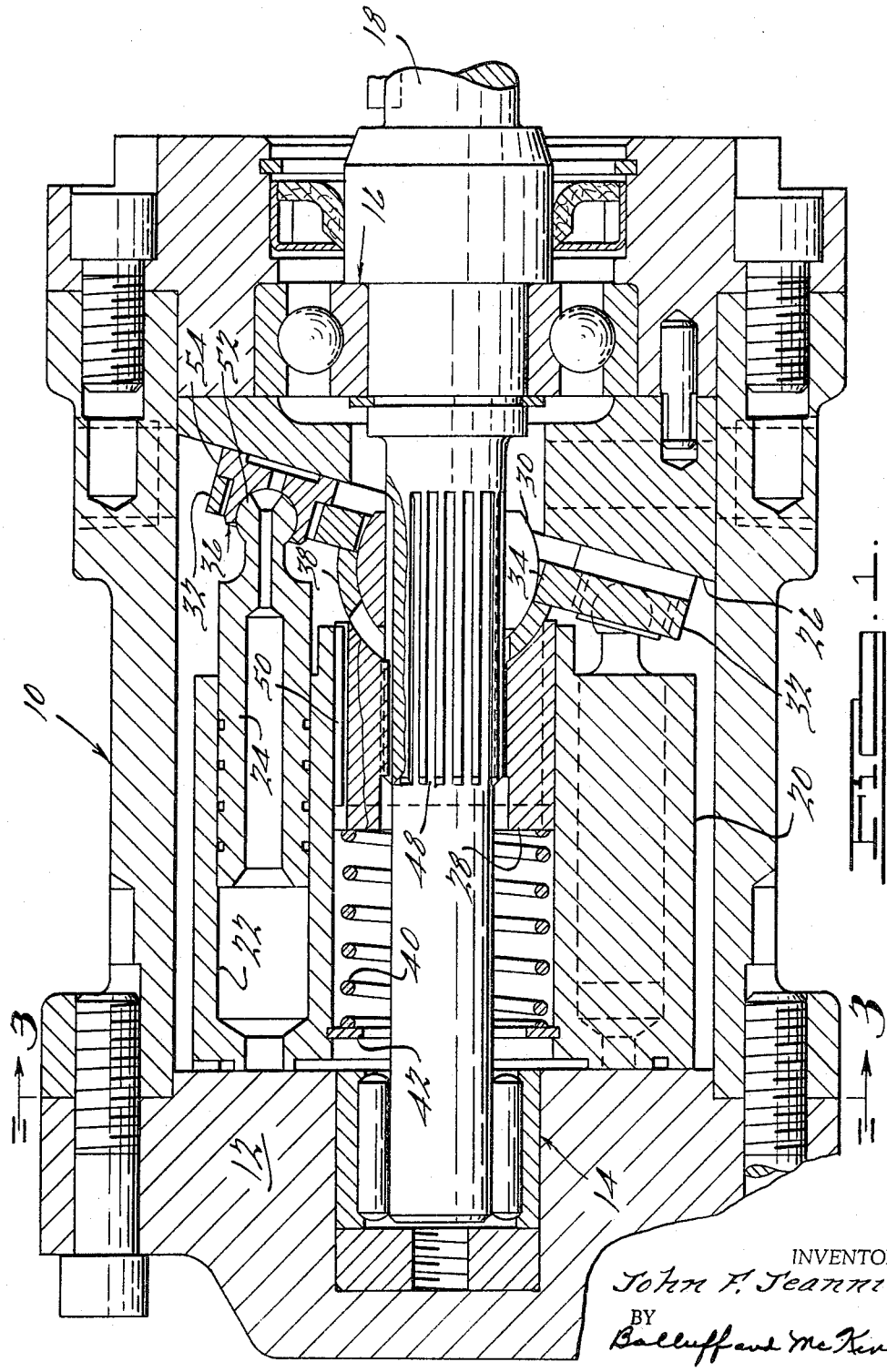

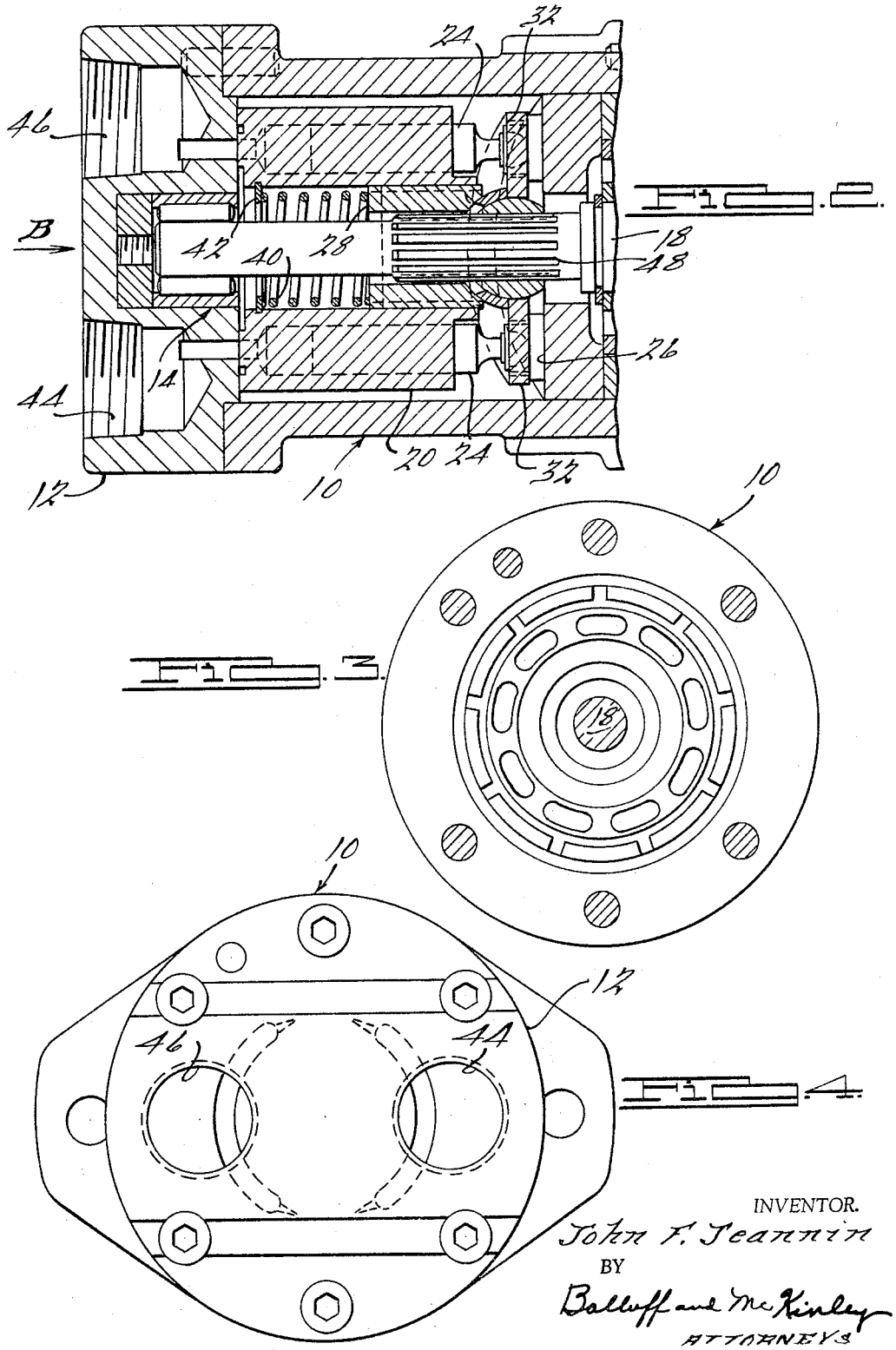

3,285,193
FLUID PRESSURE ENERGY TRANSLATING DEVICE
John F. Jeannin, 19326 Braile, Detroit, Mich.
Filed July 13, 1964, Ser. No. 382,093
4 Claims. (Cl. 103—162)

This invention relates in general to fluid pressure energy translating devices useful as positive displacement pumps or fluid motors, and in particular has reference to devices of this type having a rotary cylinder barrel abutting a stationary valve plate and provided with axial cylinders and pistons reciprocable therein which abut against a thrust plate, the axis of which is inclined relative to the axis of rotation of the cylinder barrel. Power transmissions as illustrated in U.S. Letters Patent Nos. 2,776,627 and 2,776,628 are exemplary of such devices. Commercially available devices of this type are generally unsatisfactory above medium speeds and above medium pressures. The present invention provides certain new and useful improvements in devices of this type whereby such devices may be made so as to operate satisfactorily and efficiently at speeds and pressures substantially in excess of conventional pumps of this type.

A principal object of the invention is to provide a new and improved construction for axial piston type positive displacement pumps and motors of the swash plate type whereby such devices may be efficiently operated at speeds and pressures substantially higher than is possible now with conventional designs.

Other and further objects of the invention will be apparent from the following description and claims and may be understood by reference to the accompanying drawings, of which there are two sheets, which by way of illustration show a preferred embodiment of the invention and what I now consider to be the best mode of applying the principles thereof. Other embodiments of the invention may be used without departing from the scope of the present invention as set forth in the appended claims.

In the drawings:
FIG. 1 is a longitudinal sectional view of a pump embodying the invention;
FIG. 2 is a similar view on a reduced scale and taken in a plane at right angles to the view illustrated in FIG. 1;
FIG. 3 is a sectional view on a reduced scale taken along the line 3—3 of FIG. 1; and
FIG. 4 is an end elevational view of the pump, looking in the direction of arrow B of FIG. 2.

Referring now to FIG. 1, a fluid pressure energy translating device comprises in general a housing 10 provided with a stationary valve plate 12 and spaced bearings 14 and 16, a drive shaft 18, a rotatable cylinder barrel 20 having a plurality of axial cylinder bores 22, pistons 24 reciprocable in the bores, an inclined thrust plate 26, a splined drive collar 28, a guide 30 having a free sliding fit on the drive shaft and having a spherical outer surface, a retractor plate 32 having a central cylindrical recess 34 slightly larger in diameter than the spherical outer surface of the guide 30, the retractor plate 32 having a driving connection 36 with each of the pistons 24, an equalizer 38 swivelled on the guide 30 and disposed in contact with and between the collar 28 and the plate 32, and a coil spring 40 around the shaft 18 and confined between a thrust washer 42 on the cylinder barrel 20 and the collar 28 whereby the cylinder barrel is biased against the valve plate 12 and the collar 28 reacts on the equalizer 38 for biasing it against the retractor plate 32 so as to bias the ends of the pistons against the thrust plate 26.

The valve plate 12 is bolted to one end of the housing 10 and is provided with inlet and outlet ports 44 and 46, as shown more particularly in FIGS. 2 and 4, which are alternately connectable through the valve plate 12 to the cylinder bores 22 by rotation of the cylinder barrel, such valving arrangement being conventional.

The shaft 18 extends through the hollow barrel 20 which is provided with a splined portion 48 thereon upon which the splined drive collar 28 is slidably splined, the collar 28 also having external splines for cooperation with internal splines 50 in the barrel 20 so as to provide a driving connection between the shaft 18 and the barrel 20. The collar 28 also functions to locate the barrel 20 as to its lateral position relative to the shaft 18. The splined connection between the collar 28 and the shaft 18 and the barrel 20 preferably is of the universal type so as to compensate for slight angularity between the shaft 18 and the cylinder barrel axis and to insure flat engagement of the cylinder barrel against the valve plate.

The guide 30 is free on the shaft; that is, it is free to turn or move axially relative to the shaft 18. The outer spherical surface of the guide 30 forms a support for the equalizer which is swivelled thereon, the end of the collar 28 being concave so as to form a socket for the equalizer 38. The rim at the open side of the equalizer seats against the retractor plate 32 and this in turn has a free sliding fit on the outer peripheral surface of the guide 30. The centers of the spherical surfaces of the guide 30 and the equalizer 38 lie on the drive shaft axis.

Each of the pistons 24 at one end thereof is provided with a spherical head 52 which is swivelled in a slipper 54. The slippers 54 ride on the surface of the thrust plate 26 and are located in apertures in the retractor plate 32 whereby the retractor plate 32 turns with the barrel 20 but in a plane parallel to the plane of the thrust plate 26. The equalizer 38 under the influence of the spring 40 biases the retractor plate 32 against the enlarged base portions of the slippers 54 and thus biases the slippers 54 against the thrust plate 26.

Inasmuch as the cylindrical recess 34 in the retractor plate 32 is slightly larger in diameter than the diameter of the spherical outer surface of the guide 30, the retractor plate is free to shift and turn relative to the guide 30 and hence will seek its own position on the guide 30. The guide 30 thus radially locates the retractor plate 32 while the axial position of the latter is determined by the reaction of the spring 40 thereon. In any event, the equalizer 38 cooperates with the ends of the pistons 24 for locating the retractor plate 32 so that the plane thereof intersects the center of the spherical surface 30 while permitting relative axial movement therebetween.

While I have illustrated and described a preferred embodiment of my invention, it is understood that this is capable of modification, and I therefore do not wish to be limited to the precise details set forth but desire to avail myself of such changes and alterations as fall within the purview of the following claims.

I claim:
1. A fluid pressure energy translating device comprising: a housing having a valve plate, a drive shaft, a rotatable cylinder barrel in abutment with said valve plate and having a plurality of axial cylinder bores open to said valve plate, pistons reciprocable in the bores, an inclined thrust plate mounted in the housing in driving relation with the pistons, inlet and outlet ports alternately connectable through the valve plate to said cylinder bores by rotation of the cylinder barrel, a drive collar splined on said shaft and positioned between said shaft and barrel for locating the barrel as to lateral position and having a splined driving connection with said barrel, a guide having a free sliding fit on said drive shaft adjacent said collar and having a spherical outer surface, the center of said spherical surface lying on the drive shaft axis, a retractor plate having a central cylindrical recess slightly larger in diameter than the spherical outer surface of said guide, said plate being disposed with said guide freely disposed in said recess for radially locating said plate relative to said shaft, said plate being arranged so as to have a driving connection with said pistons, an equalizer swivelled on said guide and disposed between said collar and said plate, said equalizer having radially disposed thrust surfaces which abut against said plate around said recess therein, and a coil spring around said shaft and confined between the cylinder barrel and said collar whereby the cylinder barrel is biased against the valve plate and the collar biases said equalizer against said retractor plate for biasing the pistons against the thrust plate.

2. A fluid pressure energy translating device comprising: a housing having a valve plate and spaced bearings, a drive shaft supported on said bearings, a rotatable cylinder barrel in abutment with said valve plate and having a plurality of axial cylinder bores exposed to said valve plate, pistons reciprocable in the bores, an inclined thrust plate mounted in the housing in driving relation with the ends of said pistons, inlet and outlet ports alternately connectable through the valve plate to said cylinder bores by rotation of the cylinder barrel, a splined drive collar slidably splined on said shaft between said bearings and positioned between said shaft and barrel for locating the barrel as to lateral position and having a slidable splined driving connection with said barrel, a guide having a free sliding fit on said drive shaft between one of said bearings and said collar and having a spherical outer surface, the center of said spherical surface lying on the drive shaft axis, a retractor plate having a central cylindrical recess slightly larger in diameter than the spherical outer surface of said guide, said retractor plate being disposed with said guide freely disposed in said recess for radially locating said plate relative to said shaft, said plate being arranged so as to have a driving connection with said pistons, an equalizer swivelled on said guide and disposed between said collar and said plate, said equalizer having thrust transmitting surfaces which abut against said plate around the recess therein, and a coil spring around said shaft and confined between the cylinder barrel and said collar whereby the cylinder barrel is biased against the valve plate and the collar biases said equalizer against said retractor plate for biasing the pistons against the thrust plate, said equalizer cooperating with the ends of said pistons for locating said retractor plate so that it intersects the center of said spherical surface.

3. In a fluid pressure energy translating device having a housing, a valve plate, a drive shaft, a rotatable cylinder barrel in abutment with said valve plate and having a plurality of axial cylinder bores open to said valve plate, pistons reciprocable in the bores, an inclined thrust plate in the housing in driving relation with the pistons, inlet and outlet ports alternately connectable through the valve plate to said cylinder bores by rotation of the cylinder barrel, that improvement comprising a drive collar on said shaft and positioned between said shaft and barrel for locating the barrel as to lateral position and having a driving connection with said barrel and shaft, a guide having a free sliding fit on said drive shaft and having a spherical outer surface, the center of said spherical surface lying on the drive shaft axis, a retractor plate having a central cylindrical recess slightly larger in diameter than the spherical outer surface of said guide, said plate being disposed with said guide in said recess for radially locating said plate relative to said shaft, an equalizer disposed in contact with and between said collar and said plate, said equalizer having thrust transmitting surfaces in constant engagement with the surface of said plate around said recess therein, and a coil spring around said shaft and confined between the cylinder barrel and said collar whereby the cylinder barrel is biased against the valve plate and the collar biases said equalizer against said retractor plate for biasing the pistons against the thrust plate.

4. In a fluid pressure energy translating device comprising a housing having a valve plate and spaced bearings, a drive shaft supported on said bearings, a rotatable cylinder barrel in abutment with said valve plate and having a plurality of axial cylinder bores open to said valve plate, pistons reciprocable in the bores, an inclined thrust plate mounted in the housing in driving relation with the pistons, and inlet and outlet ports alternately connectable through the valve plate to said cylinder bores by rotation of the cylinder barrel: a drive collar on said shaft between said bearings and positioned between said shaft and barrel for locating the barrel as to lateral position and having a driving connection with said shaft and barrel, a guide on said drive shaft between one of said bearings and said collar and having a spherical outer surface, the center of said spherical surface lying on the drive shaft axis, a retractor plate having a central cylindrical recess slightly larger in diameter than the spherical outer surface of said guide, said plate being disposed with said guide in said recess for radially locating said plate relative to said shaft, said plate having a driving connection with each of said pistons, said collar having a spherical socket therein, an equalizer swivelled in said socket and having an angular radially extending surface which abuts the surface of said plate around said recess therein, and a coil spring around said shaft and confined between the cylinder barrel and said collar whereby the cylinder barrel is biased against the valve plate and the collar biases said equalizer against said retractor plate for biasing the pistons against the thrust plate.

References Cited by the Examiner
UNITED STATES PATENTS

| | | | |
|---|---|---|---|
| 2,953,099 | 9/1960 | Budzich | 103—162 |
| 3,139,038 | 6/1964 | Stewart | 103—162 |
| 3,191,543 | 6/1965 | Hann et al. | 103—162 |

MARK NEWMAN, *Primary Examiner.*

SAMUEL LEVINE, *Examiner.*

R. M. VARGO, *Assistant Examiner.*